United States Patent Office 3,503,735
Patented Mar. 31, 1970

3,503,735
PROCESS OF RECOVERING METALLIC NICKEL
FROM NICKELIFEROUS LATERITIC ORES
Donald Beggs, Toledo, Fred H. Bunge, Bay Village, and
Dmitri N. Vedensky, Cleveland, Ohio, assignors to The
Hanna Mining Company, Cleveland, Ohio, a corporation of Delaware
Filed May 19, 1966, Ser. No. 551,381
Int. Cl. B22b 23/06, 23/04
U.S. Cl. 75—31
14 Claims

ABSTRACT OF THE DISCLOSURE

A process is disclosed for recovering nickel from lateritic ores wherein a charge of the ore and a fixed amount of a carbonaceous reducing agent are heated by radiant heat to reduce all of the nickel and a portion of the iron. Following reduction the charge is rapidly heated to a temperature of at least 2500° F. to promote migration and coalescence of the metallized portions. Then the product is magnetically concentrated to recover an enriched nickel concentrate.

This invention relates generally, as indicated, to the recovery of metallic nickel and more particularly to a process of recovering metallic nickel from nickeliferous lateritic ore deposits by controlled metallization of the nickel and iron content in a very rapid heating cycle.

Because of its valuable properties and numerous industrial uses, it is very desirable to have a practical process for separating and recovering metallic nickel from the ore deposits in which it occurs.

Nickeliferous lateritic ore deposits, in which significant quantities of nickel are found, are formed by chemical decomposition of ultrabasic igneous rocks carrying nickel and are characterized by residual or superficial enrichment of iron at the surface and enrichment of nickel in a saprolitic transitional zone between the iron-rich laterite at the surface and fresh bed rock in depth.

Curves 1 and 2, which will be described hereinafter, illustrate a classical profile of lateritic nickel ores. The metallic distribution curves clearly show that the iron-rich portions of the deposits, termed iron laterite (or liminotic section), are high in iron and relatively low in nickel, silica and magnesia. In what is now called the saprolitic zone, the iron content falls off and the contents of silica, nickel and magnesia are increased, so that this zone represents a very important nickel-enriched part of the deposit.

It must be pointed out that what is referred to as a saprolite zone has, in the past, been described as a serpentine zone. The term "serpentine" is used generally in old literature, although a more detailed classification shows that in addition to nickeliferous saprolitized serpentine zones, other types of saprolite, such as nickeliferous saprolitized serpentine zones, other types of saprolite, such as nickeliferous saprolized peridotite ores and nickeliferous silica boxwork ores are also found. For additional information, and a more detailed description of such ores, reference may be made to the glossary of geology and related sciences published by the American Geological Institute, Washington, D.C., 1957.

It is characteristic of the nickeliferous lateritic ores that nickel minerals found in such deposits are extremely finely disseminated and cannot be concentrated by even extremely fine grinding and any method of mechanical concentration. In general, nickel in the iron laterite occurs usually as nickel oxide adsorbed on the surface of iron oxide minerals such as hematite and limonite. In the nickel-enriched saprolite zone, nickel occurs essentially as complex nickel-magnesia silicates or iron-nickel complex silicates in which nickel replaces part of the iron molecule.

Several metallurgical processes have been adopted to recover nickel from lateritic ores. At Nicaro, Cuba, a chemical process was adopted in which the ore is roasted with a reducing agent to convert nickel minerals to the metallic form. The ore is then subjected to a leaching process with an ammonium carbonate solution whereby nickel is extracted by being dissolved as a nickel-ammonia complex ion. The solution is then separated from the solids and basic nickel carbonate is precipitated by driving off excess ammonia by the use of steam. Such process is expensive to use, and while it is capable of giving a high recovery on high iron content ore, very poor recoveries were obtained on high magnesia, low iron saprolitic ores in which nickel occurs as silicates.

Another process which has been used consists of dissolving nickel from the ground ore with sulfuric acid by the use of autoclaves operated at high temperatures and pressures. Very high recoveries have been obtained, but the process is limited to use with ores low in magnesia, because magnesia minerals are also dissolved by sulfuric acid, and with increasing quantities of magnesia, acid consumption becomes prohibitive. Such process may thus be used only with ores having not higher than about 2 percent magnesia which means that the process is not capable of treating economically the nickel-enriched saprolite ore.

Another process which is often used for ore beneficiation is that involving electric furnace smelting. This process has a very practical disadvantage, however, in the beneficiation of nickeliferous lateritic ores, for naturally occurring deposits of such ores are usually found in locations where hydroelectric power is not available.

It has long been known that the nickel and iron contents of lateritic ores could be reduced rather readily using either gaseous or solid fuels under proper temperature conditions. It is also well known that selective reduction of these metals is possible, because nickel reduces much more readily than iron and at lower temperatures. A great deal of work has been done on selective reduction of iron and nickel without smelting the ores but attempting to coagulate reduced metallic nickel and iron particles into larger grains so that they can be subsequently separated from the other constituents of the ore by grinding and mechanical separation. It is significant, however, that in spite of the apparent simplicity of this selective reduction process, it has never, prior to this invention, progressed beyond the laboratory stage.

The reason for this failure is twofold. First, it is essential that the metallic content of reduced iron and nickel be such that nickel comprises at least about 20 percent and preferably 50 to 60 percent of the total metallic iron and nickel produced during reduction. This requires very exacting control of the reduction process which is extremely difficult to achieve on a commercial scale.

It is a principal object of this invention therefore to provide an improved process for the concentration and recovery of metallic nickel from nickeliferous lateritic ores by use of a very rapid heating cycle.

It is an additional object of this invention to provide a process for recovering metallic nickel by controlled metallization of the nickel and iron contents of lateritic ores.

An additional object of this invention is to provide an improved process of recovering metallic nickel by very rapid and carefully controlled reduction roasting and agglomeration at high temperatures.

Yet another object is the provision of such a process whereby on the order of 80 percent by weight or better of the nickel content of the original ore can be recovered as metallic nickel.

It is a further object of this invention to provide a process in which metallic nickel can be recovered from a lateritic ore deposit without subjecting the ore to a chemical treatment and the concomitant problems mentioned above.

Other objects, features and advantages of this invention will be apparent to those skilled in the art after a reading of the following more detailed description.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Referring now more particularly to the drawings, the process of this invention will be described. A nickeliferous lateritic ore, which contains a substantial iron content as for example a minimum of approximately 10 percent by weight is intimately admixed with a reducing agent to prepare a charge of the ore for use in this invention. The ore deposits which are suitable for use in this invention are generally termed "nickeliferous lateritic ores," and, as previously described, include nickeliferous laterite ores, nickeliferous saprolite ores, nickel silicate ores, nickeliferous saprolitized serpentine ores, nickeliferous saprolitized peridotite ores and nickeliferous silica boxwork ores. The process of this invention is, however, applicable to all nickel bearing ores or materials so long as a significant nickel content is present.

Figure 1:
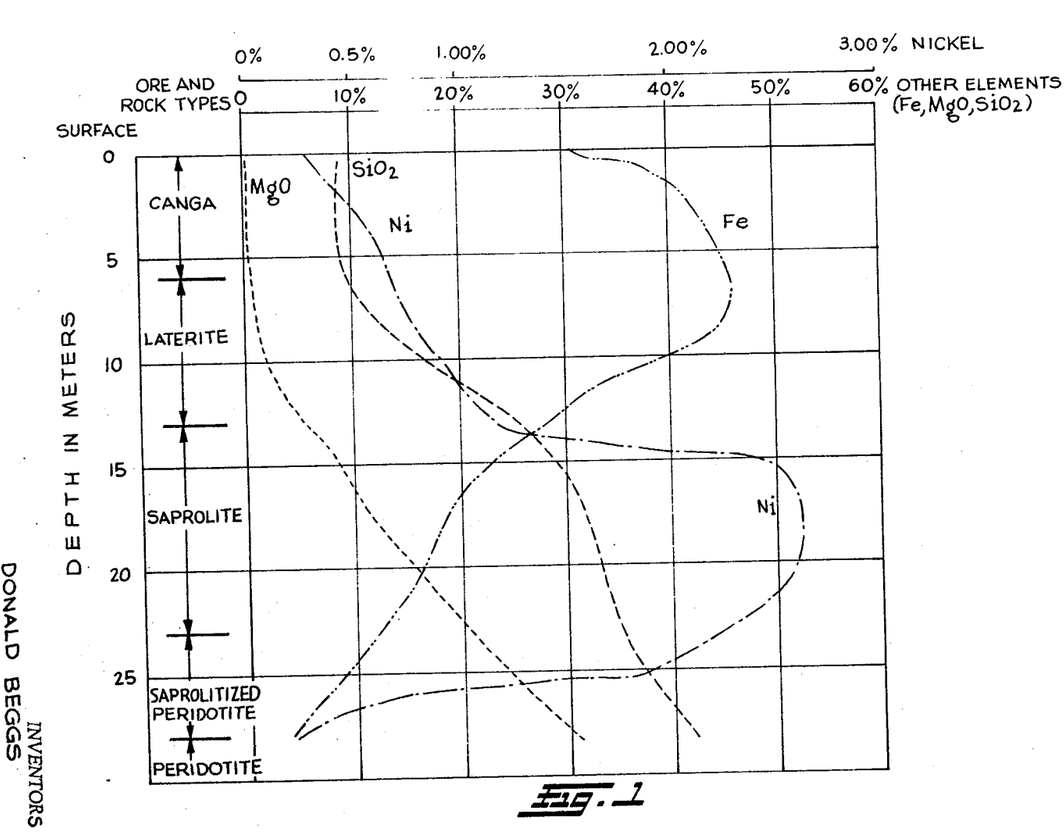
FIGS. 1 and 2 are graphic representations of profiles of nickeliferous lateritic ores showing the metal distribution with respect to the distance from the surface of the earth.
Figure 2:
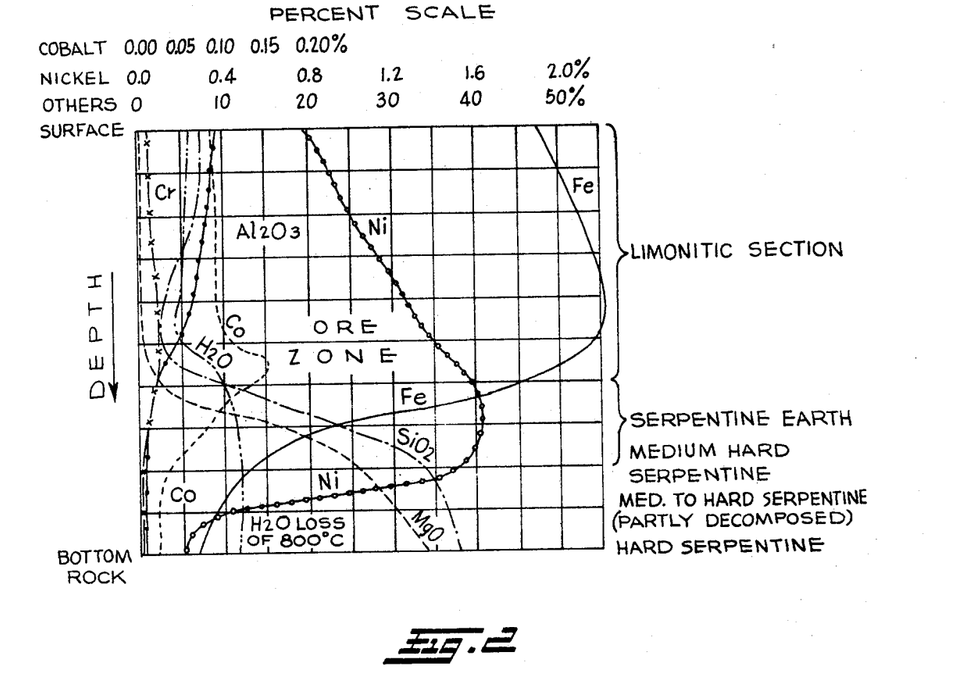

As shown by FIGS. 1 and 2, the nickel, MgO and $SiO_2$ contents of nickeliferous lateritic ores increase as the distance from the surface of the earth increases. Accordingly, it will be appreciated that if the layer or strata of the ore is used which contains the most significant nickel content, such layer will also contain quite high quantities of MgO and $SiO_2$.

The problem posed by the presence of magnesia and $SiO_2$ is that of significantly affecting the operating temperature which must be used in subsequent steps of the process. In general, the greater the quantity of these constituents which is present, the higher the temperature which is necessary to produce a liquidus phase medium from the gangue constituents of the ore, as will be explained in more detail hereinafter. It is essential therefore that the quantity of such constituents be controlled so that a practical operating temperature may be used.

The nickeliferous lateritic ore, as mentioned above, should have a minimum iron content of approximately 10 percent by weight to provide sufficient residual iron oxide so that the operating temperature may be within practical limits and the nickel content thereof may be recovered effectively as metallic nickel, as will be more fully explained hereinafter. It has been found that if the iron content is substantially less than this amount, the recovery of metallic nickel will be lower than is desirable. In general, however, there is no maximum quantity of iron which can be in the ore.

The ore deposits may be residual, that is naturally occurring, or enriched nickeliferous lateritic ores so long as the requisite iron content is present either by original inclusion or by addition and the quantities of MgO and $SiO_2$ are not excessive. The ore deposits should also have a significant nickel content, this terminology being used in the manner commonly understood by those associated with the field of ore beneficiation and recovery. In general, the nickel content should be a minimum of about 0.5% by weight and preferably at least about 1.0 to 1.5%, although this may vary depending upon the precise ore composition and the quantity which is used.

Prior to admixing with the reducing agent, the ore is preferably dried to decrease the moisture content so that the ore can more readily be crushed or ground to reduce its particle size. It is not necessary to completely dry the ore, as a certain amount of moisture may be retained without adversely affecting metallization, especially if the ore is to be briquetted or pelletized after admixture with the reducing agent. For example, such admixture may contain up to approximately 15 to 20 percent moisture when it is to be compacted into briquette or pellet form without producing undesirable effects.

After drying, the ore is preferably crushed to facilitate admixture of the ore with the reducing agent. Preferably, the ore is crushed to approximately a —10 mesh particle size (U.S. Standard Sieve Size), although the particle size of the ore may vary, depending upon the composition of the ore charge and the particular reducing agent which is used.

After crushing, a charge of the ore is prepared by thoroughly and uniformly intermixing the ore particles with a carbonaceous reducing agent so that the partial metallization or reduction of the nickel and iron contents can be efficiently and effectively controlled. The function of the reducing agent is to effect the chemical reduction of the ore and particularly of the nickel and iron contents thereof, i.e., reducing the iron and nickel oxides to the respective metals, in the partial metallization step which follows. The reducing agent is a solid and must be capable of reacting at the temperature used in the metallization step to release reductants which efficiently perform the desired reduction.

For this purpose, there are many suitable reducing agents available. Illustrative examples include various coke substances, such as petroleum and bituminous coke, bituminous, sub-bituminous and anthracite coal, low rank fuels, coke products produced from such fuels, and char prepared from fossil fuels or wood, so long as such substance contains fixed carbon.

The solid reducing agent may be intimately admixed with the ore in any suitable commercially available mixing apparatus, prior to the partial metallization step. The duration of the mixing will, of course, depend upon the efficiency of the apparatus and upon the particle size of the ore and thus is variable over a considerable range of time.

The admixture of ore and reducing agent may be introduced into a furnace in particulate form or in the form of pellets or briquettes. The use of pellets or briquettes or other such "compact" form has the advantage of providing for better heat transfer between the reducing agent and the ore particles and thus provides for more efficient and effective use of the reducing agent and hence better control of the reduction process.

If pellets or briquettes are to be used, normally approximately 10 to 15 weight percent water is added during compaction to assist in forming the desired pellets or briquettes. After compaction, the compacts are again dried at a relatively low temperature, as for example about 200 to 300° F., to drive off the free water, i.e., the water not combined with the ore grains.

In the furnace, the admixture is subjected to heating under such conditions so that substantially all of the reducing agent is exhausted or consumed (some fixed carbon will undoubtedly remain but the agent will be substantially depleted), thus reducing substantially all of the nickel content to metallic nickel but only partially reducing the iron content to the metallic state. In the preferred practice of the invention, the metallic iron content will be a maximum of a ratio by weight of metallic iron to metallic nickel of approximately 4:1, which is sufficient metallic iron to produce generally a ferro-nickel alloy product containing at least approximately 20 percent by weight nickel. In general, it is desirable to have a ferro-nickel alloy product which contains at least about 50 weight percent nickel and consequently the ratio of metallic iron to nickel will preferably be about 1:1.

Only a relatively short period of time is required to reduce the nickel and iron oxide, generally being no more than about 5 to 10 minutes, although this time, of course, depends upon the reduction temperature and efficiency of the furnace which is used and also upon the particular reducing agent and the amount of such which are used. At the end of this period of time, substantially all of the reducing agent will have been exhausted, and consequently, all of the nickel will have been reduced to the metallic state and substantially all of the iron oxide will also have been reduced to either the metallic state or to wustite (FeO).

In order to effect the desired partial metallization or reduction, it is only necessary to subject the charge to a sufficient temperature to react the carbonaceous reducing agent, and in general, this will be a temperature on the order of approximately 1800° F. to about 2300° F. The temperature may, of course, be higher if desired, and in a preferred form of the present invention the furnace temperature will be on the order of from about 2400° F. to 2600° F. as this is the approximate temperature range at which the partially reduced charge is to be subsequently heated as will be explained hereinafter.

After the above-described partial metallization, the partially reduced charge is subjected to further heating at a sufficiently high temperature to produce a liquidus phase medium from the gangue constituents and residual iron oxide of the ore but without substantial melting of the metallic iron and nickel. The reduced charge is thus heated to a temperature above the liquidus temperature of such gangue constituents but below the melting temperature of the metallic iron and nickel and is retained at this temperature for a period of time sufficient to promote migration of metallic nickel particles to metallic iron particles with coalescence and grain growth of such particles. The gangue constituents of the ore will thus be in a plastic or liquidus condition to serve as the medium in which the metallic particles can grow and coalesce, with the extent of formation of the liquidus phase being dependent upon the temperature and heating time employed. In general, the furnace temperature will be within the range of approximately 2500 to 2600° F., although the temperature necessary will vary somewhat depending upon the ore composition, and the ore will be retained in such temperature zone for approximately two to five minutes. The duration of such heating is, of course, dependent upon the particular temperature which is to be used, with the ultimate criterion being that the charge must be heated sufficiently long for the metallic iron grains to grow substantially and to increase in physical size by coalescing with each other and with the particles of metallic nickel thus acting as carriers or collectors therefor. In general, there is no size limitation on the grain growth, although, for practical reasons, the heating will be kept to a minimum time.

In order to produce the desired liquidus phase medium, the temperature of the charge has to be above the liquidus temperature of the gangue constituents, i.e., the MgO, $SiO_2$, silicates, wustite, etc., and will normally be at least approximately 2500° F., although this temperature will vary quite significantly depending upon the MgO, $SiO_2$ and iron contents of the ore. If the ore is high in MgO or $SiO_2$, the temperature necessary to produce the liquidus phase will be increased considerably unless the charge also contains sufficient iron which, after the controlled reduction, will be in the form of wustite and thus capable of reacting with or combining with the MgO and $SiO_2$ in some manner to reduce its melting temperature. For example, if the MgO content of the ore is approximately 12 percent or less and the charge contains the requisite minimum iron content, a temperature of about 2550° F. to 2600° F. may be used and approximately 11 minutes or less retention time in the furnace will be necessary to reduce the nickel and iron oxides and achieve sufficient grain growth and coalescence. The MgO content of the lateritic ore therefore is preferably controlled so as to be a relatively small amount and generally it is preferred to maintain it at a maximum of approximately 15 to 20 percent by weight, based on the total weight of the ore composition, as otherwise the necessary operating temperature may be too high to obtain practically.

If the ore contains high quantities of MgO or $SiO_2$, however, the effective operating temperature may be lowered to within tolerable limits by the addition of small quantities of inorganic additives such as lime, sodium such as soda ash or other similar materials which serve to decrease the liquidus temperature of the gangue constituents.

As discussed above, the conditions of time and temperature for the partial reduction and liquidus heating may be varied, and thus the basic requirement of the particular heating device to be employed is that it be capable of maintaining a sufficiently high temperature for a long enough period of time to decompose the reducing agent to effect the desired partial reduction and to promote the necessary grain growth and coalescence. The furnace should also be capable of maintaining a constant temperature for a long enough period of time so that the reduction and grain growth may be accomplished under oxidation-reduction equilibrium conditions thereby facilitating the control of such.

It is quite important that reoxidation of the metallic iron and nickel particles and further substantial reduction of the metallic iron particles be prevented while the reduced ore is heated to promote the described grain growth and coalescence. Accordingly, this step is performed in atmosphere which is substantially devoid of free oxygen and preferably one which is under oxidation-reduction equilibrium conditions. The furnace atmosphere will thus contain substantial amounts of carbon dioxide, carbon monoxide, hydrogen and water vapor but will not contain free or elemental oxygen.

Such equilibrium conditions are accomplished by maintaining a desired volume ratio in the heating atmosphere of carbon monoxide to the total of carbon monoxide and carbon dioxide, and, preferably, also a desired volume ratio of hydrogen to hydrogen and water vapor. Such atmosphere conditions within the furnace may be regulated by controlling the makeup of the fuel which is used to heat the furnace so as to provide the desired ratio or ratios.

Figure 3:
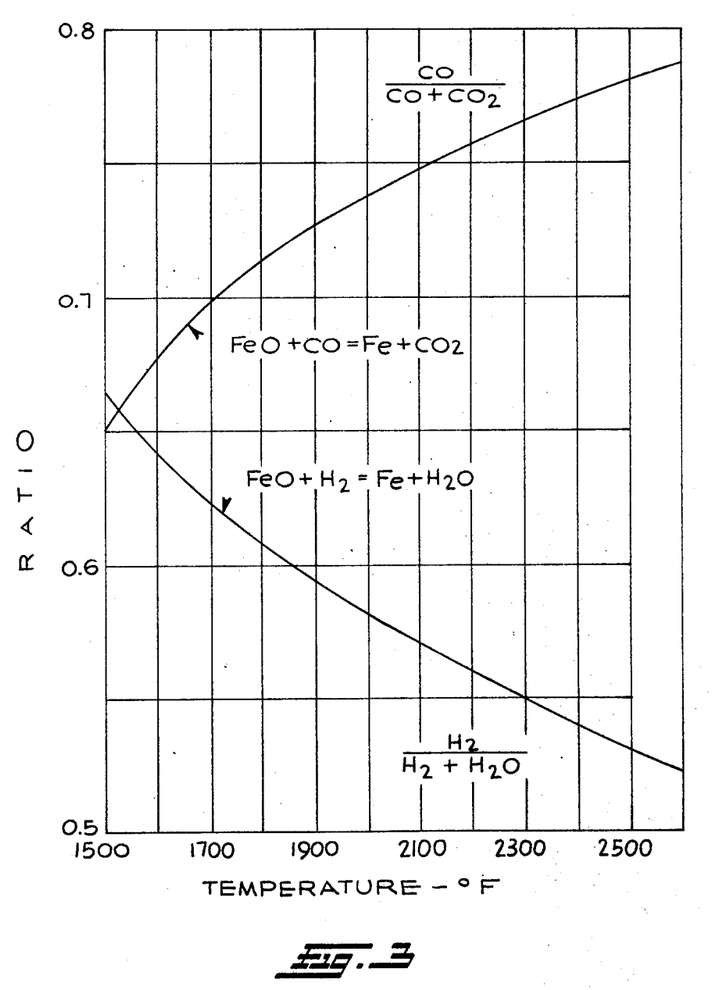
FIG. 3 is a graphic representation of the oxidation-reduction equilibrium conditions.

Referring to FIG. 3 of the drawings, such conditions are represented graphically for various temperatures which may be employed herein. As thus illustrated, it will be observed that the $$\frac{CO}{CO+CO_2}$$

volume ratio for equilibrium conditions increases with temperature whereas the $$\frac{H_2}{H_2+H_2O}$$

volume ratio for equilibrium conditions decreases with temperature. Consequently, for any given temperature, the desired ratio or ratios may be easily ascertained from this or any similar graph. In general, as can be seen from the graph, for a temperature of $$\frac{CO}{CO+CO_2}$$

volume ratio will be approximately 0.78 and the $$\frac{H_2}{H_2+H_2O}$$

volume ratio will be approximately 0.53.

After the ore has been partially reduced and subsequently heated as discussed above, the charge is cooled, preferably by water quenching, generally to ambient temperature to preclude the metallic iron and nickel from reoxidizing. The charge is thereafter preferably ground to a particle size of about −100 mesh to facilitate magnetic concentration. The particle size may, however, be varied and can be larger or smaller, depending primarily upon the size to which the metallic grains have formed and also upon the efficiency of the particular magnetic concentration device which is used.

After grinding to the appropriate particle size, the charge is magnetically concentrated in the known manner by any standard commercially available apparatus for such purpose. By magnetically concentrating the charge, the metallized particles are concentrated and separated as an enriched nickel containing nickel-iron alloy concentrate from the other constituents of the ore referred to as tailings, which are comprised of the magnesium oxide and other similar constituents The concentrate is thereafter recovered, and the metallic nickel may be separated from the metallic iron by any of the usual methods, such as pyrometallurgical, hydrometallurgical or electrolytic separation, or alternatively the concentrate may be melted and a refined ferro-nickel product subsequently produced.

Figure 4:
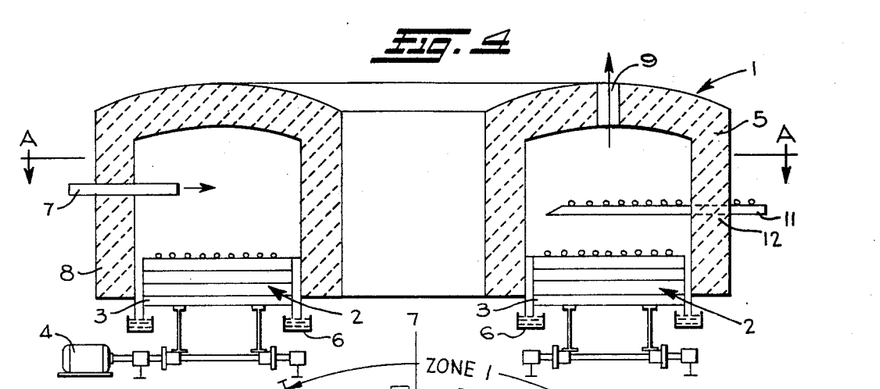
FIG. 4 is a vertical section view of a typical rotary hearth furnace.
Figure 5:
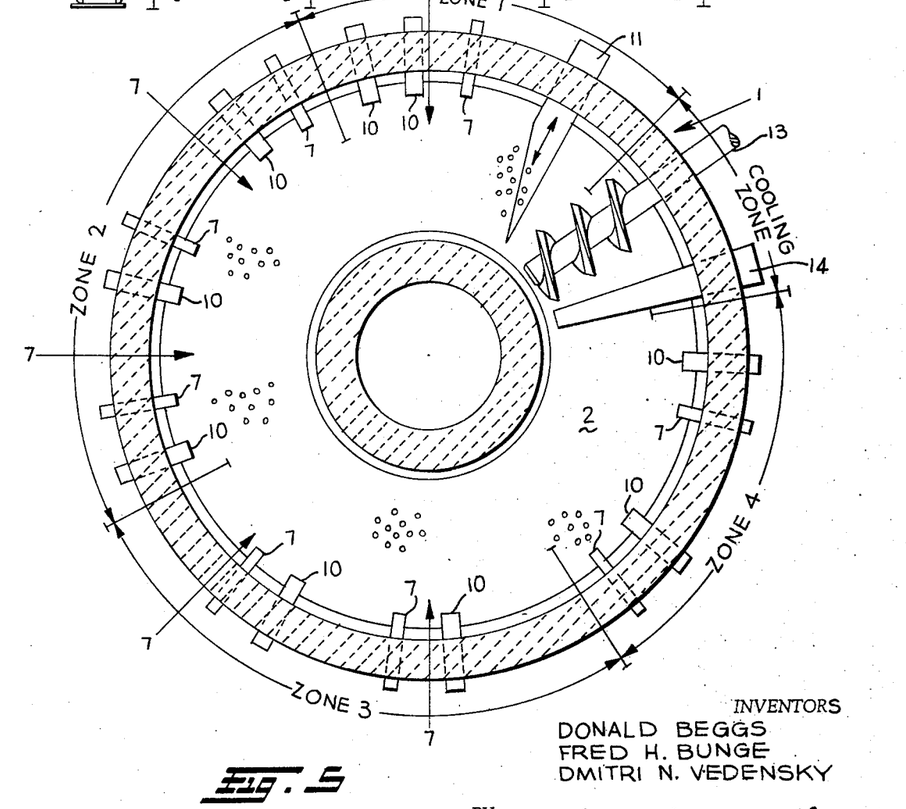
FIG. 5 is a top plan view of the furnace taken on line A—A of FIG. 4.

In FIGS. 4 and 5, a typical rotary hearth furnace, designated generally by numeral 1, is illustrated as one example of a suitable furnace for use in practicing the process of this invention. It will be appreciated, however, that other conventional, commercially available furnaces may also be used. The furnace includes an annular rotary hearth 2, which includes a metal shell 3, and may be strengthened by heat resistant retainer brackets (not shown) as per the standard means of construction of such furnaces. The shell is of the standard type used in such furnaces and contains in series a bottom layer of insulating refractory, an intermediate layer of a hard castable refractory, and a surface layer of a highly refractory material such as high purity magnesia.

The annular hearth is conventionally supported on rails which are in turn supported on wheeled members driven by any conventional means as for example an electric motor 4. The hearth is disposed within a "doughnut" shaped enclosure 5 and is sealed in the conventional manner as by water seal 6. The furnace has a radiant heating environment of conventional burner means 7 positioned in the vertical wall 8 of the furnace enclosure, and the enclosure is vented by flue means 9.

As shown more clearly in FIG. 5, a plurality of burners and air injection pipes 10 are dispersed circumferentially of the hearth in suitable ports in the furnace enclosure to control the temperature and atmosphere in each of the furnace zones. By means of these burners, predetermined temperatures and gas compositions issuing therefrom can be established and maintained in the zones of the furnace.

A conventional feeder as for example a vibratory type is shown at 11 for feeding the lateritic ore-reducing agent admixture onto the hearth. This extends through an opening 12 in the wall of the furnace a suitable distance above and as close as practical to the surface of the hearth. A helical discharge screw 13 is also included for removal of the admixture after it has completed the burning cycle, and a chill plate 14, preferably of the water cooled type, is positioned within the furnace to cool the ore prior to removal from the furnace.

The process of this invention operates generally as follows. As shown in FIG. 4, there are 4 heating zones in the furnace through which the hearth and the charge pass as the hearth rotates in a counterclockwise direction. As previously explained, the reducing agent and ore admixture has been dried, compacted, and subsequently dried again prior to being introduced into the furnace. The compacts are preferably fed into furnace in a uniform thickness layer, approximately one or two layers in thickness, to provide good exposure to the radiant heating environment. As the admixture is fed into the rotary hearth through the feeding mechanism 11, it passes first through a preheating zone, with the furnace temperature being on the order of at least about 1800° F. to 2000° F. Approximately two minutes are required for the charge to be rotated through this zone. As the admixture passes through this zone, the combined water in the lateritic ore, that is the water which is intimately associated with the particles of the ore, is volatized and the temperature of the charge is gradually increased. As the admixture passes through zone 1 and into zone 2, the temperature of the charge continues to increase gradually, and the furnace temperature in zone 2 is slightly higher than in zone 1, being about 2300 to 2500° F. In this zone, the hydrocarbon volatiles in the reducing agent are driven off and also some of the nickel oxide, at least on the surface of the charge, is reduced to metallic nickel as the fixed carbon in the reductant begins to decompose. It is believed that at the surface of the charge, almost all of the nickel oxide will have been so reduced. The charge is in zone 2 for approximately three minutes.

In zone 3, the temperature is again slightly higher, approximately 2500° F. to 2600° F., and the reaction of the fixed carbon is largely completed, thus completing the reduction of the nickel and iron oxides. The iron oxide which is not reduced to metallic iron will be reduced to wustite (FeO). Also in this zone, at least on the surface of the charge, the liquidus medium begins to form.

In zone 4, significant amounts of the liquidus phase are produced, the temperature of the furnace in this zone being approximately 2550° F. to 2600° F. This is where the previously described grain growth and coalescence occur. The charge will remain in zone 4 for approximately two minutes through its cycle in the furnace.

As mentioned previously, it is very important that the furnace atmosphere be substantially devoid of free oxygen during formation of the liquidus phase to avoid reoxidation of the metallic particles. To facilitate control of such atmosphere in zones 3 and 4, the gases are preferably passed through the furnace in a direction countercurrent to the ore as it is rotated on the hearth.

After the hearth has rotated the charge through zone 4, the ore is removed from the furnace by helical discharge screw 11. The ore must be removed from the hearth while it is still in a softened or plastic condition as otherwise it will solidify as a mass and adhere to the surface of the hearth.

The ore is cooled to approximately room temperature to preclude reoxidation of the metallic particles and is ground as previously described and subjected to magnetic concentration to separate and recover the metallic nickel and iron particles. The concentrate product from the magnetic concentration may still have some grains of the gangue constituents locked within the ferro-nickel grains and these may be separated by further heat treatment to produce a melt causes the metallic particles to separate from the oxide particles with the oxides forming a slag and floating off in the standard manner.

The invention will be better understood by reference to the following specific but non-limiting examples.

EXAMPLE I

The nickeliferous lateritic ore of this example had the following composition:

| Component: | Analysis, percent |
|---|---|
| Ni | 2.71 |
| Fe | 19.65 |
| $SiO_2$ | 38.56 |
| $Al_2O_3$ | 2.64 |
| CaO | 0.18 |
| MgO | 11.52 |
| LOI (loss on ignition) | 12.40 |
| Cr | 0.44 |
| S | 0.021 |
| Phos. | 0.022 |

A 275 lb. charge was dried and thereafter crushed to a particle size of approximately −10 mesh, after which it was thoroughly admixed with 3.0 weight percent of coal, briquetted and dried. The dried briquettes were then placed into a rotary hearth furnace of the type illustrated in FIG. 4 and brought to a temperature of approximately 2600° F. in zones 3 and 4 to effect the desired partial reduction of the nickel and iron oxides and the grain growth and coalescence of the nickel and iron particles. The charge was retained in the furnace for about 7.25 minutes. The furnace atmosphere was maintained in substantial oxidation-reduction equilibrium conditions with a $$\frac{CO}{CO+CO_2}$$

volume ratio of about 0.74 and a $$\frac{H_2}{H_2+H_2O}$$

volume ratio of approximately 0.46.

The furnace product was cooled to approximately room temperature to avoid reoxidation of the metallic nickel and iron, ground, and was then concentrated magnetically with a laboratory magnetic separator known as a Davis tube. The nickel-iron alloy concentrate from the Davis tube was analyzed by standard techniques to determine the nickel and iron content. The recovery of nickel and iron based on the original available quantities was calculated, and the results of this experiment are tabulated in the table which follows under the heading "Distribution Percent."

EXAMPLE II

The procedure of Example I was followed, and a 2000 lb. charge of a nickeliferous lateritic ore of the composition of Example I was thoroughly admixed with 3.0 weight percent of coal. The admixture was then briquetted and dried as before and placed into a rotary hearth furnace, and the temperature of the furnace was increased to 2550° F. in zones 3 and 4. The charge was retained in the furnace for about 10.8 minutes. The furnace atmosphere had a $$\frac{CO}{CO+CO_2}$$

volume ratio of approximately 0.80 and a $$\frac{H_2}{H_2+H_2O}$$

ratio of 0.55. The product from the furnace was cooled to about room temperature and was thereafter ground. After grinding, the product was concentrated magnetically in the Davis tube.

The nickel-iron alloy concentrate was subsequently analyzed and the distribution percentage of the nickel and iron of the Davis tube concentrate was calculated. The results of this experiment are also shown in the following table.

EXAMPLE III

The procedure of Examples I and II was followed, and the percent of reducing agent, furnace temperature, retention time and atmosphere were the same as in Example II. After cooling of the furnace product, it was subjected to grinding and was then concentrated magnetically. The magnetic concentrate was subsequently analyzed to determine the nickel and iron content, and the distribution percentage of the nickel and iron was calculated. The results of this experiment are also shown in the table.

EXAMPLE IV

In this experiment, a nickeliferous lateritic ore having the following composition was used:

| Component: | Analysis, percent |
|---|---|
| Ni | 2.06 |
| Fe | 23.32 |
| $SiO_2$ | 25.31 |
| $Al_2O_3$ | 5.58 |
| CaO | 1.77 |
| MgO | 17.20 |

A 50 lb. charge of this ore was dried and subsequently admixed with 2.0 weight percent of coal. This charge was briquetted, dried and then placed in a rotary hearth furnace and the temperature of the furnace was 2550° F. in zones 3 and 4. The charge was retained in the furnace for 11.9 minutes, and the atmosphere of the furnace had a $$\frac{CO}{CO+CO_2}$$

ratio of 0.786 and a $$\frac{H_2}{H_2+H_2O}$$

volume ratio of 0.53. The furnace product was again cooled, and was subsequently concentrated magnetically in the Davis tube as in the preceding examples.

The nickel-iron alloy concentrate product from the Davis tube was analyzed to determine the nickel and iron content, and the distribution percentage of the nickel and iron was calculated. The results of this example also appear in the table.

EXAMPLE V

An ore having the composition of Example IV was used and a 50 lb. charge of the ore was intimately admixed with 3.0 weight percent of coal. After briquetting and drying, it was placed in the rotary hearth furnace and the temperature was increased to 2550° F. as in the previous examples. The charge was retained in the furnace for about 11.9 minutes. The furnace atmosphere during heating had the same $$\frac{CO}{CO+CO_2}$$

volume ratio and $$\frac{H_2}{H_2+H_2O}$$

volume ratio as in Example IV. The furnace product was cooled to avoid reoxidation, and was subsequently ground after which it was magnetically concentrated in a Davis tube as in the preceding examples.

The Davis tube concentrate was subsequently analyzed to determine its nickel and iron content and the distribution percentages thereof were also calculated. The results appear in the table.

EXAMPLE VI

This example differed from Example V only in that the furnace product was ground for approximately 3 hours prior to magnetic concentration. The results of this example are also found in the table.

content was significantly lower than in the other examples, and this reduced recovery is believed to result from

TABLE I

| Example No. | Reductant wt., percent | Temp., °F. | Retention time (min.) | Concentrate product Wt. percent | Analysis, percent Ni | Analysis, percent Fe | Distribution, percent Ni | Distribution, percent Fe |
|---|---|---|---|---|---|---|---|---|
| 1 | 3.0 | 2,600 | 7.25 | 10.72 | 23.66 | 39.09 | 82.09 | 17.39 |
| 2 | 3.0 | 2,550 | 10.8 | 13.21 | 24.59 | 34.40 | 91.65 | 20.35 |
| 3 | 3.0 | 2,550 | 10.8 | 8.39 | 35.72 | 40.80 | 91.23 | 15.63 |
| 4 | 2.0 | 2,550 | 11.9 | 13.06 | 15.13 | 35.84 | 89.74 | 17.55 |
| 5 | 3.0 | 2,550 | 11.9 | 11.72 | 17.61 | 48.40 | 89.97 | 21.11 |
| 6 | 3.0 | 2,550 | 11.9 | 8.38 | 23.31 | 56.80 | 90.25 | 18.67 |

EXAMPLE VII

To demonstrate the significance of the iron and MgO contents of the ore, the following example was conducted in which an ore containing relatively high MgO and low iron was used. The nickeliferous lateritic ore had the following composition:

| Component: | Analysis, percent |
|---|---|
| Ni | 1.98 |
| Fe | 7.71 |
| $SiO_2$ | 35.64 |
| $Al_2O_3$ | 1.88 |
| CaO | 0.22 |
| MgO | 17.60 |

A 50 lb. charge was dried, crushed to approximately —10 mesh and thereafter admixed with 3.0 weight percent coal. The coal-ore admixture was briquetted and dried and then placed into the rotary hearth furnace, the temperature of which was approximately 2600° F. in zones 3 and 4. The retention time within the furnace was 9.81 minutes. The furnace atmosphere in zones 3 and 4 was maintained in substantial oxidation-reduction equilibrium conditions as in the previous examples, the $$\frac{CO}{CO+CO_2}$$

volume ratio being about 0.73 and the $$\frac{H_2}{H_2+H_2O}$$

ratio approximately 0.44.

The furnace product was cooled to room temperature and was then magnetically concentrated in the Davis tube. The nickel-iron alloy concentrate from the Davis tube was analyzed, and the nickel content was found to be 12.76% and the iron content 20.41% by weight. The distribution percentage of the nickel was only 11.40 weight percent and the iron was only 3.70 weight percent.

From a comparison of the results of Example VII with those of Examples I–VI, it will be appreciated that the percentage of recovery of nickel from the original ore was significantly lower than in the other examples, and this reduced recovery is believed to result from the higher MgO and lower iron contents of the ore used in Example VII.

EXAMPLE VIII

As a further indication of the successful results of this invention, a continuous operation was conducted over a period of several days using a nickeliferous lateritic ore having the composition of Example I, which was briquetted after admixing with 3 percent coal. The operating conditions of the furnace and the rate of feed are shown in Table II, as well as the concentrate recovery data.

As can be seen from such table, extremely high recoveries of metallic nickel were made throughout the duration of the run.

TABLE II

| Feed rate, #/hr. | Product rate #/hr. | Residence time (min.) | Temp., °F. | Furnace atmosphere $H_2$ | Furnace atmosphere CO/CO | Concentrate data Ni recovery, percent | Concentrate data Fe recovery, percent |
|---|---|---|---|---|---|---|---|
| 334 | 283 | 10.2 | 2,510 | 22.9 | 1.66 | | |
| 350 | 255 | 10.2 | 2,550 | 27.8 | 1.86 | 89.38 | 20.72 |
| 275 | 267 | 10.3 | 2,550 | 29.2 | 3.74 | 91.77 | 27.83 |
| 324 | 193 | 10.2 | 2,555 | 28.5 | 3.54 | 91.83 | 16.40 |
| 331 | 216 | 9.9 | 2,545 | 30.3 | 2.76 | 89.34 | 14.26 |
| 352 | 217 | 9.6 | 2,510 | 30.4 | 3.58 | 90.82 | 16.16 |
| 338 | 213 | 9.8 | 2,530 | 31.2 | 4.20 | 92.28 | 14.79 |
| 335 | 228 | 9.6 | 2,505 | 30.3 | 4.51 | 92.30 | 19.61 |
| 363 | 223 | 9.6 | 2,495 | 30.8 | 4.26 | 92.26 | 16.26 |
| 322 | 254 | 9.9 | 2,520 | 30.8 | 4.20 | 91.42 | 14.04 |
| 320 | 241 | 9.6 | 2,535 | 28.3 | 3.57 | 92.67 | 11.50 |

The extent of reduction of the iron oxide which can be tolerated is controlled generally by the quantity of gangue constituents which are present in the original ore, since the quantity of gangue constituents, and particularly the MgO and silica contents controls the amount of ferrous oxide (wustite) which is needed within the system. The amount of ferrous oxide which is needed in turn dictates the amount of metallic iron which can be present since the original ferric oxide will generally be reduced to one of these two forms. In general, it has been found that best results in the recovery of high content metallic nickel containing nickel-iron alloy concentrates are obtained when the reduction process is controlled to produce a metallic iron content not in excess of a ratio by weight of metallic iron to nickel of approximately 4:1.

In order to control effectively the metallization of the iron content of the ore, the preferred technique is to limit the quantity of reductant which is used. Under the roasting or heating conditions, limiting the amount of reductant present necessarily restricts the amount of reduction which can take place. To achieve the desired percent of metallized iron, the amount of reductant should be limited generally to the range of from about 0.5 percent to about 6 percent by weight of the reductant-lateritic ore admixture.

The reduction of the iron oxide may alternatively, of course, be controlled by proper correlation of the parameters of time and temperature employed in the heating or roasting step. In view of the difficulties involved in maintaining constant high temperature for long periods of time, however, the preferred technique is that of limiting the quantity of reducing agent which is used.

It has been found that controlling the reduction of a nickeliferous lateritic ore of the type described to reduce substantially completely the nickel oxide to the metallic state but only a portion of the iron oxide followed by heating to produce a liquidus phase medium from the gangue constituents of the ore permits the subsequent magnetic recovery of an enriched metallic nickel containing nickel-iron alloy concentrate. Since the nickel content of the ore deposit is generally relatively small, the reduction process produces only a relatively small amount of metallic nickel which is very finely distributed. The metallic iron grains produced, however, are much larger in size and thus grow when heated under appropriate conditions of temperature and time and act as collectors or carriers for the fine particles of metallic nickel. As a result, the metallic nickel and iron particles can trereafter be efficiently recovered as a nickel-iron alloy by magnetic concentration since the metallic nickel and iron alloy is strongly magnetic whereas the iron oxide and other constituents of the tailings are only very weakly magnetic at best. It is important, however, that only a relatively small quantity of the iron in the charge be reduced as otherwise the nickel-iron alloy will contain too much metallic iron, thereby decreasing the percentage of metallic nickel in the recovery concentrate and making subsequent separation of the metallic nickel from the nickel-iron alloy more difficult.

Other modes of applying the principle of the invention may be employed, change being made as regards the details described, provided the features stated in any of the following claims, or the equivalent of such, be employed.

We therefore particularly point out and distinctly claim as our invention:

1. A process of producing an enriched metallic nickel containing concentrate which comprises roasting a nickeliferous lateritic ore containing a significant nickel content in the presence of a carbonaceous reducing agent until substantially all of said reducing agent is exhausted to reduce substantially all of the nickel content to metallic nickel and to reduce partially the iron content to metallic iron, further heating such partially reduced charge in an atmosphere substantially devoid of free oxygen to a temperature of at least approximately 2500° F. for a period of about 2 to about 5 minutes to produce a liquidus phase medium from the gangue constituents and residual iron oxide of the ore thereby to promote migration of metallic nickel particles to metallic iron particles with coalescence and grain growth of such particles, magnetically concentrating such charge, and recovering an enriched nickel containing concentrate.

2. The process of claim 1 in which the reducing agent is present in an amount of from about 0.5% to about 6% by weight based on the admixture.

3. The process of claim 1 in which said further heating to produce a liquidus phase medium is conducted under oxidation-reduction equilibrium conditions as determined by the $CO/CO+CO_2$ volume ratio in such heating atmosphere whereby further reduction and oxidation of such partially reduced charge are avoided.

4. The process of claim 1 in which the metallic iron content is a maximum of a ratio of approximately 4:1 by weight of metallic iron to metallic nickel after completion of such reduction.

5. A process for producing an enriched metallic nickel containing concentrate which comprises preparing a charge of a solid carbonaceous reducing agent and a nickeliferous lateritic ore containing a significant nickel content, heating such charge until substantially all of said reducing agent is exhausted to reduce substantially all of the nickel content to metallic nickel and to reduce the iron content to metallic iron and to wustile, subjecting the thus partially reduced charge to further heating at a temperature of at least approximately 2500° F. for a period of approximately 2 to about 5 minutes to produce a liquidus phase medium from the gangue constituents and residual iron oxide of such ore to promote migration of metallic nickel particles to metallic iron particles with coalescence and grain growth of such metallic particles, maintaining oxidation-reduction equilbrium conditions in such heating atmosphere to avoid oxidation or further reduction of such charge during such further heating, magnetically concentrating such charge, and subsequently recovering an enriched nickel containing concentrate.

6. A process of producing an enriched nickel containing concentrate which comprises roasting a charge of a carbonaceous reducing agent and a nickel bearing ore containing a significant nickel content, gangue constituents and a minimum of approximately 10 percent by weight of iron content until substantially all of said reducing agent is exhausted to reduce substantially all of the nickel content to metallic nickel and a maximum content of metallic iron of a ratio of approximately 4:1 by weight of metallic iron to metallic nickel, further heating such partially reduced charge in an atmosphere substantially devoid of free oxygen to a temperature of at least approximately 2500° F. for a period of about 2 to about 5 minutes to produce a liquidus phase medium from the gangue constituents and residual iron oxide of the ore thereby to promote migration of metallic nickel particles to metallic iron particles with coalescence and grain growth of such metallic particles, magnetically concentrating such charge, and recovering an enriched nickel containing concentrate.

7. A process of producing an enriched metallic nickel containing concentrate which comprises feeding to a furnace a charge of carbonaceous reducing agent and a nickel bearing material containing a significant nickel content, gangue constituents and a minimum of approximately 10 percent by weight of iron content, roasting such charge until substantially all of said reducing agent is exhausted to reduce substantially all of the nickel content to metallic nickel and to reduce partially the iron content to metallic iron, further heating such partially reduced charge in a radiant heating environment to a temperature of at least approximately 2500° F. for a period of about 2 to about 5 minutes to produce a liquidus phase medium from the gangue constituents and residual iron oxide of the core thereby to promote migration of metallic nickel particles to metallic iron particles with coalescence and grain growth of such particles, and removing such material from such furnace.

8. The process of claim 7 in which such material is removed from the furnace while still in a plastic condition to avoid solidification and adherence to the furnace surface.

9. The process of claim 7 in which the furnace atmosphere during at least such further heating is substantially devoid of free oxygen.

10. The process of claim 7 in which the gases in such furnace atmosphere are passed countercurrently to the passage of the nickel bearing material through such furnace.

11. A process of producing an enriched metallic nickel containing concentrate which comprises introducing a charge of nickeliferous lateritic ore containing a significant nickel content and a carbonaceous reducing agent into a radiant heating environment, such charge being positioned so as to be exposed directly to radiant heat within such heating environment, exposing such charge to a first heating area within such radiant heating environment at a temperature of approximately 1800 to about 2000° F. to volatilize the combined water in such charge, subjecting such charge to a second heating area within such radiant heating environment at a temperature of about 2300 to about 2500° F. to continue metallization of the nickel and iron oxides of such charge, and thereafter subjecting such charge to further heating within such radiant heating environment at a temperature of at least about 2500° F. to complete the metallization of the nickel content of such charge and reduce partially the iron content thereof to metallic iron, and to produce a liquidus phase medium thereby to promote migration of metallic nickel particles to metallic iron particles with coalescence and grain growth of such particles, magnetically concentrating such charge, and recovering an enriched nickel containing concentrate.

12. The process of claim 11 in which such further heating is for a period of approximately 2 to about 5 minutes.

13. The process of claim 11 in which such charge is exposed to such first heating area for a period of approximately 2 minutes and to such second heating area for a period of approximately 3 minutes.

14. The process of claim 11 in which such charge is retained in such radiant heating environment for a maximum time of approximately 12 minutes.

References Cited

UNITED STATES PATENTS

| | | | |
|---|---|---|---|
| Re. 26,042 | 6/1966 | Grebe et al. | 75—82 X |
| 1,717,160 | 6/1929 | Kichline | 75—82 X |
| 2,400,098 | 5/1946 | Brogden | 75—82 |
| 2,994,601 | 8/1961 | Greene | 75—31 |
| 2,998,311 | 8/1961 | Illis et al. | 75—82 |
| 3,043,681 | 7/1962 | Udy et al. | 75—31 X |
| 3,238,039 | 3/1966 | Sasabe | 75—31 |
| 3,272,616 | 9/1966 | Queneau et al. | 75—82 |

HENRY W. TARRING II, Primary Examiner

U.S. Cl. X.R.

75—82